June 17, 1947.  D. P. BERNHEIM ET AL  2,422,287
VARIABLE DENSITY GOGGLE
Filed May 4, 1942  4 Sheets-Sheet 4
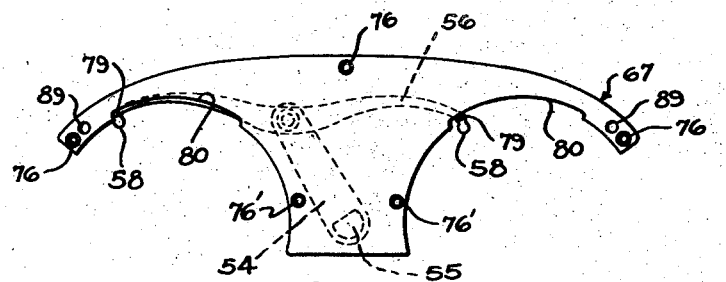
Fig. 13
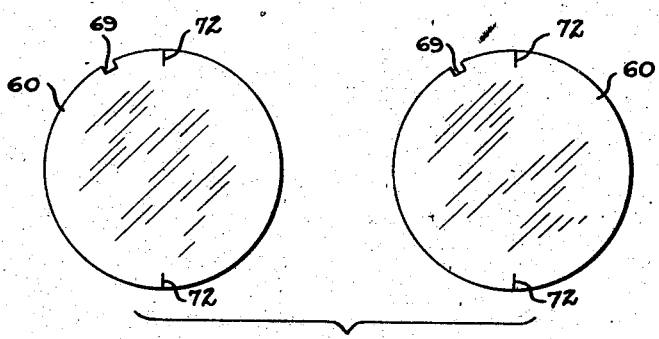
Fig. 14
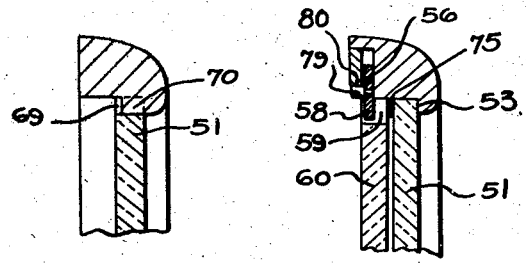 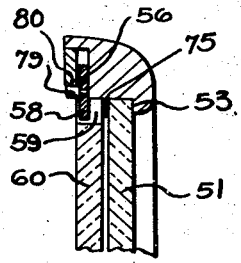
Fig. 15  Fig. 16
INVENTOR
DANIEL P. BERNHEIM
EDWARD M. SPLAINE
BY
ATTORNEY Patented June 17, 1947

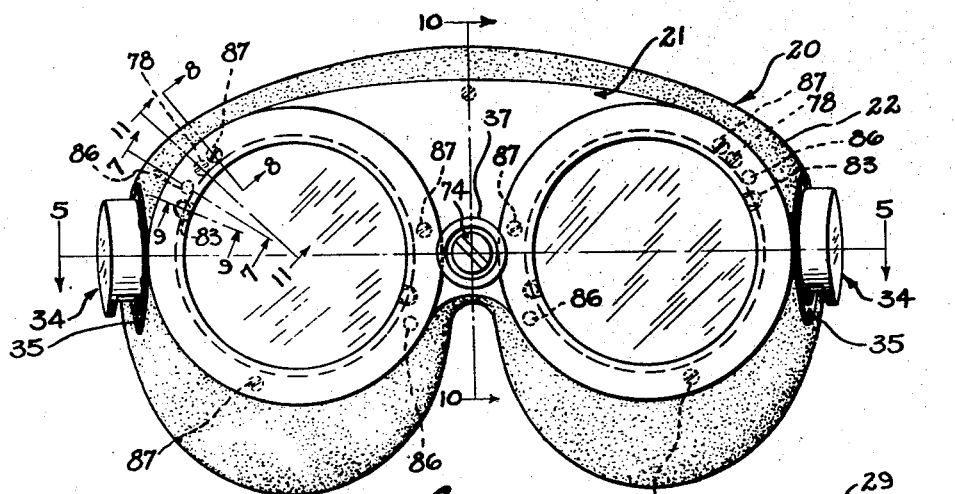
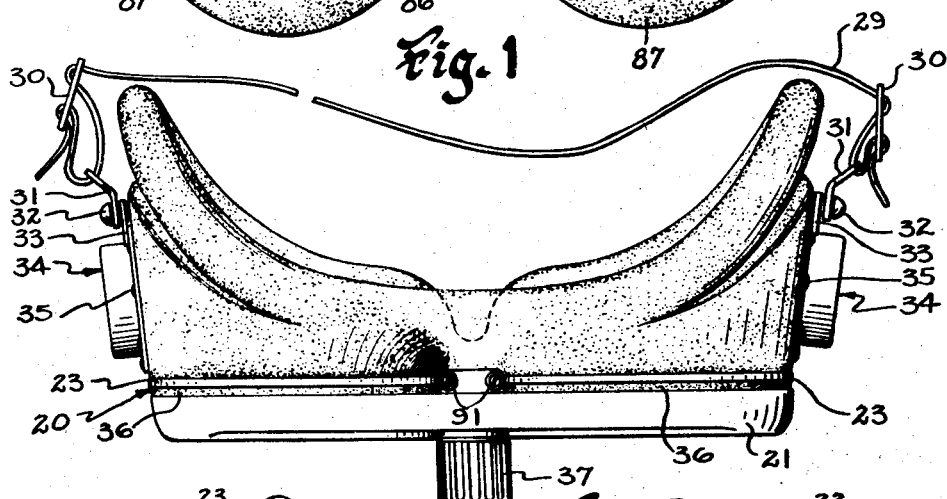
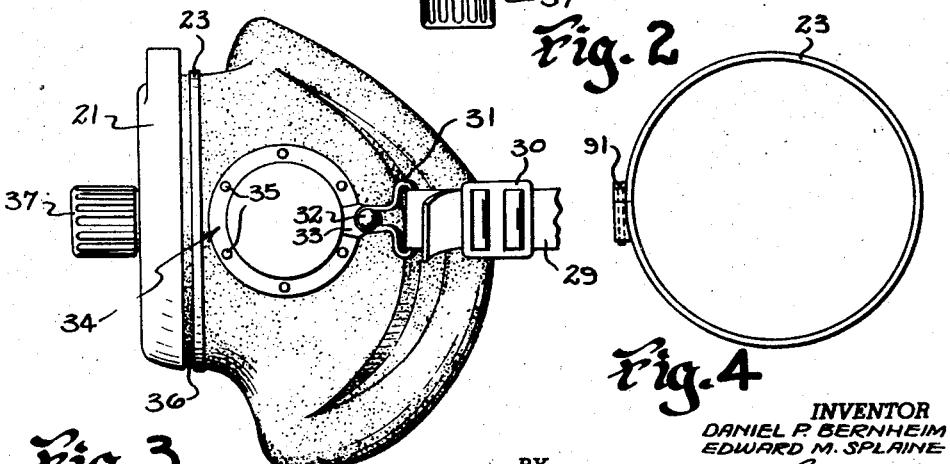

2,422,287

UNITED STATES PATENT OFFICE 2,422,287

VARIABLE DENSITY GOGGLE

Daniel P. Bernheim and Edward M. Splaine, Southbridge, Mass., assignors to American Optical Company, Southbridge, Mass., a voluntary association of Massachusetts Application May 4, 1942, Serial No. 441,644

7 Claims. (Cl. 2—14)

This invention pertains to improvements in optical mountings and has particular reference to optical mountings for polarizing light.

A primary object of the invention is to provide novel improved means for adapting optical mountings to the angle or line of polarization of incident light and to vary the overall light transmission of the light transmitting medium.

Another object of the invention is to provide improved means for varying the density of light transmission by novel means of rotating certain of the lenses.

Another object of the invention is to provide novel improved means in an optical mounting for polarizing light.

A further object of the invention is to provide a variable density light polarizing goggle whereby the light density control may be quickly and easily manipulated for determining the desired degree of light transmission.

Another object of the invention is to provide a novel construction of goggle of the above character whereby the parts may be quickly and easily assembled with each other with said parts being removable in a simple manner for cleaning and repairing said goggle.

A further object of the invention is to provide a goggle of the class described having mechanical means for locating the axis of the lenses to facilitate the replacement of said lenses at the desired polarizing axis.

A further object of the invention is to provide a goggle utilizing a face mask with novel means for securing the face mask to a groove in the rear of the front to obtain a secure light eliminating connection between the front and the cover.

A further object of the invention is to provide a lens assembly with a novel means of providing suitable frictional means between the lenses within the optical mounting and to provide a novel lever arm arrangement for remotely controlling the lens system by a single manipulation.

Other objects and advantages of the invention will become apparent from the following description taken in conjunction with the accompanying drawings. Since it will be apparent that many changes in the details of construction and arrangement of parts may be made without departing from the spirit of the invention as set forth in the accompanying claims, it is therefore not desired to limit the invention to the exact matters shown and described for the preferred forms only have been shown and described by way of illustration.

In the drawings:

Fig. 1 is a front view of the optical mounting with certain parts shown dotted to indicate the connecting and aligning means of the various parts.

Fig. 2 is a top view of the optical mounting shown in Fig. 1.

Fig. 3 is a side view of the optical mounting shown in Fig. 1.

Fig. 4 is a front view of the clamping ring for securing the front eye cup portions of the goggle face mask portions in its respective grooves in the back rings on the reverse side of the front of the optical mounting.

Fig. 13 is a rear view of the back plate with the link and control arm shown partially dotted disposed on the opposite side thereof.

Fig. 14 is a plan view of the rear rotatable lenses in proper position to be mounted in the front plate as shown in Fig. 6.

Fig. 15 is a sectional view taken along lines 15—15 of Fig. 6 showing the front lens positioning means for locating the lens in proper relation within the front plate.

Fig. 16 is a sectional view, partly broken away, taken along lines 16—16 of Fig. 6 showing the link member in position, with a section of the back plate shown in Fig. 13 being added.

Figure 6:
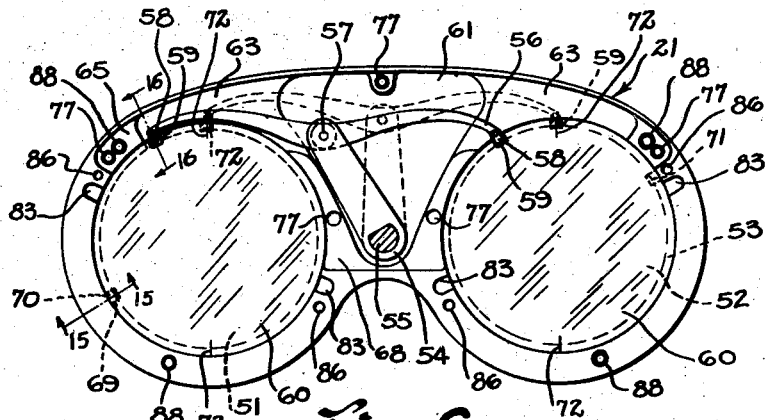
Fig. 6 is a rear view of the front plate showing the lenses in position, with the link and control arm disposed within their respective countersunk or recess portions, with a countersunk portion for the back plate.
Figure 5:
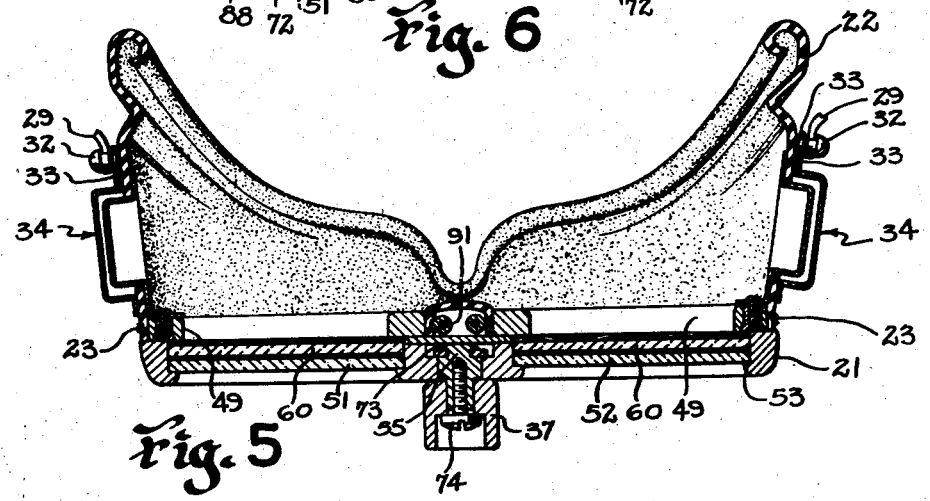
Fig. 5 is a sectional view taken substantially along lines 5—5 of Fig. 1.

Referring to the drawings and more particularly to Figs. 1, 2, and 3, a goggle 20 is shown having the front 21, which front is secured to a goggle face mask 22 by means of clamping rings 23.

A suitable headband 29 is provided having buckles 30 on the opposing ends thereof which engage clips 31 of the face mask 22. The headband 29 may be adjustable to provide various lengths of the headband per se and is preferably made of resilient material such as elastic or rubber. The clips 31 of the headband engage headed pins 32, which pins are secured to a lug 33 of the ventilator 34, which ventilator is secured to the sides of the goggle by means of pins 35. The front 21 and the eye cup portions 36 of the face mask 22 are secured together by means of clamping rings 23. A control knob 37 is rotatably connected with the lens assembly within the goggle and is pivotally connected to the front 21 for controlling the mechanism of the front assembly.

Figure 10:
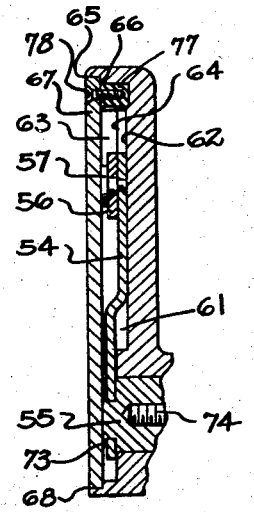
Fig. 10 is a sectional view taken along lines 10—10 of Fig. 1 showing the link and control arm in relation to the control arm stud.

Fig. 6 shows the front 21 having rear lenses 60 and two front lenses 51 and 52 therein, which front lenses rest on the shoulder 53. The front 21 is a unitary one-piece structure molded with recesses to permit movement of the various parts. Figs. 6 and 10 may be considered together for the purpose of showing the depth of the various recesses and a disposition of the control mechanism which is movably connected with the front 21. The control arm 54 is connected to the stud 55, which stud is pivotally mounted in the front 21. A link 56 is pivotally connected by a pin 57 to the control arm 54.

The section taken on lines 16—16 (Fig. 6) of the end of the link is shown in Fig. 16 with the link 56 having a protuberance 58 on the lower end thereof which fits in the slot 59 of the rear lens 60, which slot 59 is shown dotted in Fig. 6. Referring to the depth of the recesses shown in Figs. 6 and 10, the control arm recess 61 is deepest as shown by the back wall 62, in Fig. 10. The link recess 63 is not quite so deep as the recess 61, as is shown by the back wall 64. The recess 65 is shown having a back wall 66. The back wall 66 supports the outer ends of the back plate 67, which back plate is shown in Fig. 13. The depth of the recess 68 is the same depth as the recess 65, said recess 68 receives the lower end of the plate 67.

Figure 12:
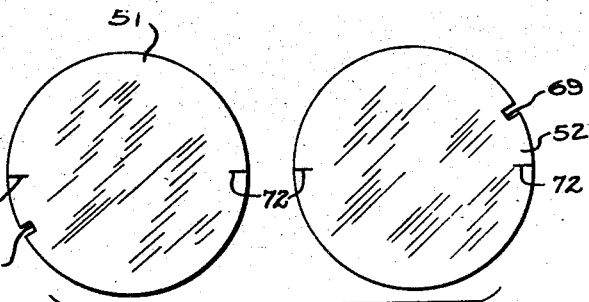
Fig. 12 is a plan view of the front lenses in proper position to be mounted in the front plate as disclosed in Fig. 6.

Fig. 15 shows a sectional view taken along lines 15—15 of Fig. 6 which shows the slot 69 in the front lens 51. A molded projection 70 is formed as part of the plastic front and is a positioning means for aligning the lens. A molded projection 71 shown in Fig. 6 is similar to the projection 70 but placed above the center of the lens for proper alignment of the front lens 52. The front lenses 51 and 52 are shown in Fig. 12 having marks 72 thereon to show the aligning axis of the lenses in relation to the slots 69 in the lenses.

In assembling the mounting, the front 21 has the control arm 54 connected to the back of the stud 55, which stud is rounded to form a head 73 to retain the control arm 54 in fixed position on the stud 55. A screw 74 fits into the control knob 37, with the screw 74 being threadedly connected to the stud 55 to hold said stud and knob in position. After the front lenses 51 and 52 are properly placed in the front 21, the rear lenses 60 are then placed into position so that the protuberance 58 fits into the rear lens slots 59 (slots 69 generally) with the marks 72 scratched on the lenses to show an aligning axis being disposed vertically as shown in Fig. 14, when the link arm is in the position shown in Fig. 6. It will be seen that the rear lenses may now be moved back and forth by the manipulation of the control knob 37. The lens spacer 75, shown in Fig. 16, fits between the stationary front lenses, and the movable back lenses and is disposed about the edges of the adjacent lenses to permit relative movement of the lenses.

Figure 8:
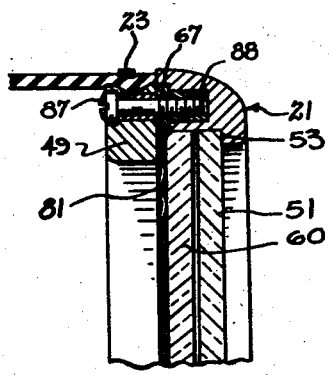
Fig. 8 is a sectional view, partly broken away, taken along lines 8—8 of Fig. 1 showing the means for securing the back ring to the front plate.
Figure 11:
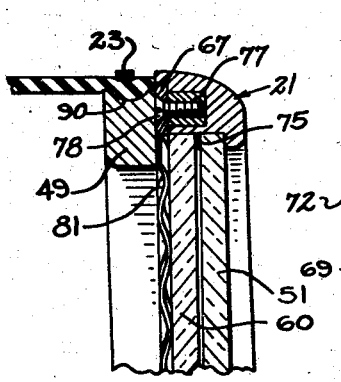
Fig. 11 is a sectional view taken along lines 11—11 of Fig. 1 to show the means of securing the back plate to the front plate.

After the front and back lenses are placed in the front 21, with the rear lenses having the protuberances 58 of the link 63 engaging the slot in the rear lenses, the back plate 67, as shown in Fig. 13, is then placed into position over the control mechanism and secured thereon. The three countersunk holes 76, shown in the back plate 67, (Fig. 13), are aligned with the threaded metal inserts 77 (Figs. 6 and 11) which are embedded in the front 21 to receive the back plate connecting screws 78 also shown dotted in Fig. 1. The two lower holes 76' shown in the back plate 67 are aligned with their respective metal inserts 77 in the front 21. The holes 76' are clearance holes in the back plate 67 to permit the back ring screws 87 to pass through the clearance holes 76' in the back plate, in much the same manner as is shown in Fig. 8 wherein the screw 87 is shown spaced from the cross sectional portion of the back plate 67. The pins 79, shown in Figs. 13 and 16, are connected to the link 56 and ride on the camming surface 80 so that the protuberances 58 will remain in the slots 59 when one of the back lenses is removed as may be the case when cleaning or repairing said goggle.

Figure 9:
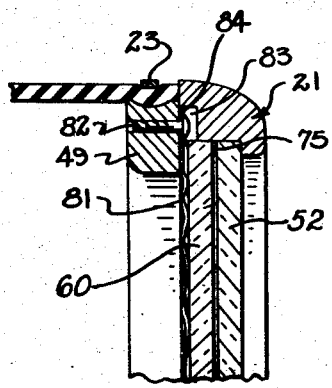
Fig. 9 is a sectional view taken along lines 9—9 of Fig. 1 showing the means for securing the spring washer to the back ring.

Fig. 9 shows the spring washer 81 being secured to the back ring 49 by means of a drive pin 82. Recesses 83, shown in Figs. 9, 6, and 1, receive the protuberance 84 of the spring washer 81 and the head of the pin 82. The spring washer is used to give a proper frictional tension between the lenses when the back ring 49 is secured in working position to the front 21.

Figure 7:
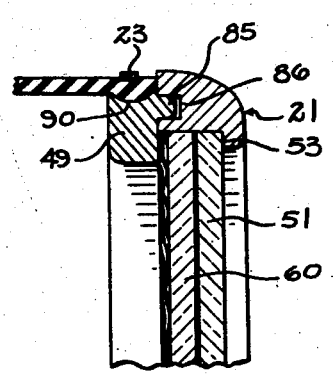
Fig. 7 is a sectional view, partially broken away, taken along lines 7—7 of Fig. 1 showing the back ring aligning means.

In Fig. 7, the independent back rings 49 have protuberances 85 on opposite sides thereof, which protuberances fit into the holes 86 shown dotted in Fig. 1. The protuberances 85 on the back ring 49 act as positioning pins so that the back ring 49 will have the proper alignment for connecting the screws 87 (Fig. 8) to the threaded inserts 88, which inserts are embedded in the front 21. The screws 87 are shown in Fig. 1, with the screws 87 passing through the apertures 89 as shown in the rear plate 67 in Fig. 13 so that the screws 87 engage their respective threaded metal inserts 88.

The eye cup portions 36 of the goggle face mask 22 are used to compress the forward edges of the eye cup portions into the groove 90 about the outer edge of the back ring 49, by means of the clamping ring 23. Fig. 4 shows the clamping ring having the screw 91 threadedly connecting opposing sides of the split clamping ring 23 to compress the material of the eye cup portions 36 into the grooves 90 to form a tight seal therebetween. It should be apparent that after the eye cup portion 36 is secured to the back ring 49 by means of the clamping ring 23, it will not be necessary to remove the clamping ring for the purpose of removing the back ring 49 to reach the control mechanism and lenses when this operation becomes necessary since the screws 87 which hold the back ring in engagement with the front 21 are readily accessible.

In Figs. 12 and 14, the marks 72 are scratched at the ends of a horizontal diameter where the lens is so rotated as to give the maximum absorption for light reflected from a horizontal vitreous surface at its polarizing angle. Wherever the term axis of polarization is used in this specification, it means the diameter referred to above. That is, the front lenses would be so disposed as to afford a maximum reduction in glare when the goggle is in normal position on the face of an individual.

The front and rear lenses are all identical in relation to the slots 69 and the marks 72 so that it becomes merely a matter of proper placement of the lenses in their respective positions when mounted in the goggle.

The two lenses shown in Fig. 12 represent the positioning of the front lenses as shown when mounted from the rear of the goggle as presented in Fig. 6. The slots 69 are disposed thirty degrees from the maximum polarizing axis indicated by the marks 72 on each lens. The left lens has the notch 69 on the left side thereof below the maximum polarizing axis, while the right lens 52 has the notch 69 disposed on the right side of the lens so that it is thirty degrees above the maximum polarizing axis. In obtaining the positioning of the right lens, assuming all of the lenses are properly stacked according to the maximum polarizing axis, the right lens must not be turned over, but must be merely rotated from the position shown by lens 51, to the position shown by lens 52, in Fig. 12.

The rear lenses shown in Fig. 14 must also be rotated until they assume the position shown in Fig. 14. When the front and rear lenses are properly mounted as shown in Figs. 12 and 14 respectively, it will be seen that the maximum polarizing axes are at right angles to each other. When in this position, a minimum amount of light is transmitted through the lens series in each eye cup so that maximum density results. The degree of movement of the rear lenses is approximately sixty degrees which is about two-thirds of the distance from full maximum density to full minimum density.

The full ninety degrees of the rear lens rotation, if desirable, may be provided by allowing thirty more degrees of movement of the lenses in construction of the goggle. However, for the type of work for which the goggles are primarily designed, it has been found that sixty degrees of rotation is sufficient, and therefore the goggle has been disclosed as having approximately sixty degrees of rotational movement.

In Fig. 6, the link 56, shown in solid lines, is disposed for maximum density, while the link shown dotted has rotated the rear lenses only thirty degrees away from the solid line position of the link, and therefore the link 56 may be rotated thirty degrees more to the right of the vertical center line of the lens.

The method of assembling the lenses in the mounting is extremely important since in all cases the lenses must be rotated for the desired position as shown in Figs. 12 and 14, and must not be turned over. This feature permits the lenses to be properly positioned in the front of the mounting so that the glasses will be properly operative when assembled. The camming surface 80 is a guide means for the pin 79, Figs. 13 and 16, so that when one of the rear lenses is removed the protuberance 58 for the other lens will not become dislodged from its slot 69 in the lens.

When properly assembled, a simple rotation of the knob 37 will cause the lenses to be rotated from the maximum to the minimum mechanical positions. While other methods of rotating the lenses have been provided such as by gearing, the present disclosure presents a variable density goggle that is readily manipulated by a lever action of the knob controlled link 56. The alignment of the front lenses therefore makes the goggle normally an anti-glare goggle, while the movable lenses in combination with the stationary lenses provide variable density of the light transmitted therethrough.

It will be noted that the spacer 75 between the front and rear lenses permits a rotating of the rear lenses, while the crinkle spring 81 which engages the rear of the back lens is held in position by two screws, but the back ring 49, when assembled, also presses against the crinkle spring 81 in such a manner as to provide an even pressure on the back lens so as to result in a smooth operation of the quick acting knob controlled lever arrangement for rotating the lenses.

The front 21 as well as the back ring 49 are made of plastic so that the various slots and positioning means for the back ring and the front lenses are molded in their respective positions saving valuable man hours in the manufacturing. The various recesses in the rear of the unitary front are molded in the plastic and consequently eliminate any machining, which of necessity, would be required if the front were not molded.

In manufacturing the variable density face mask goggle as disclosed herein, the use of the sixty degree rotational movement of the rear lenses in lieu of the ninety degree movement has several advantageous factors. In order to use the rigid link arm of the type presented herein for a ninety degree movement of the lenses it was necessary to build the goggle higher in front in order to obtain sufficient throw of the link-lever arrangement. The increase in height of the front resulted in a curved peak on the top of the front that gave the goggle a cumbersome appearance. The increase of plastic material and metallic parts with the lever and link arrangement materially added to the cost of metals, plastic and shipping weight. By changing the design so that the rotational movement of the lenses was sixty degrees not only was the overall cost of the goggle reduced, and the appearance improved, but the weight of the goggle was decreased which naturally added to comfort when in use.

While the specification sets forth the use of a rigid front with the face mask having individual eye cup portions, it is apparent that the rigid front may be used without a face mask portion so that the features of the variable density goggle may be used with headband connected directly to the front. Further, the rigid front assembly may be a unitary structure for mounting in a military gas mask where a variable density goggle may be required. Accordingly, it is realized that the disclosure presented herein is such that various features thereof may be incorporated in goggle utilizing equipment other than the specific showing.

With the former types of rear lens rotational means, the flexible band type was subject to binding and lack of efficient operation due to dirt, grit, and the like. The gear type of lens rotation was cumbersome and slow operating and difficult to manufacture as well as requiring more man hours in the manufacturing, and further did not provide the quick acting lens manipulation as is frequently required by the operators of anti-aircraft guns using a variable density goggle.

From the above, it will be seen that the design of the goggle for the purpose of production will greatly speed up the manufacture while retaining the desired characteristics of the goggle and provide a quick acting, positive operating variable density goggle.

Having described our invention, we claim:

1. In a face mask goggle, a unitary rigid front comprising a pair of front lenses, means for holding said front lenses against rotation, a pair of rear lenses rotatably mounted in the unitary rigid front, spacer means between the front and rear lens, spring means for frictionally engaging the back lenses, link means pivotally connecting each of the back lenses, a rotatable knob located in the unitary front intermediate the back lenses, and a lever arm having one end thereof securely connected to the rotatable knob with the other end thereof pivotally connected to the link to cause rotation of the rear lenses, said link and lever arm being located within a recess in the rigid front.

2. In a face mask goggle, a unitary front assembly comprising a unitary front for receiving a pair of front lenses, means for holding said front lenses in fixed relation with the unitary front, a rear lens movably mounted in spacial relation with each of said front lenses, a rotatable knob mounted on the unitary front, a link member connecting said rear lenses, a lever attached to said rotatable knob and connected to said link member intermediate the ends thereof, said link member and lever being positioned within a recess provided in the unitary front, a camming surface located adjacent each of the movable lenses, and pin means on opposite ends of the link to engage the camming surface to prevent one end of the link from becoming disassociated from its respective back lens when the other back lens is removed, and spring means for frictionally engaging the back lenses.

3. In a face mask goggle, a unitary front assembly comprising a unitary front for receiving a pair of front lenses, means for holding said front lenses in fixed relation with the unitary front, a rear lens movably mounted in spacial relation with each of said front lenses, a rotatable knob mounted on the unitary front, a link and lever arrangement connecting the knob with each of the movable lenses, a recess in the unitary front for receiving the link and lever, and a cover plate connected over said recess and link and lever assembly, a camming surface in the cover plate adjacent each end thereof, and pin means on opposite ends of the link to engage the camming surface to prevent one end of the link from becoming disassociated from its respective back lens when the other back lens is removed.

4. In a face mask goggle, a unitary front assembly comprising a unitary front portion having spaced lens receiving portions, a pair of lenses in each of said lens receiving portions, one in front of the other, means for holding said front lenses in fixed relation with said unitary front, means for supporting the rear lenses in spaced relation with said front lenses, means rotatably supported by said unitary front intermediate the lenses, link means having end portions connected with the respective rear lenses and a lever attached adjacent one end thereof to said means rotatably supported by the unitary front and connected adjacent its opposite end to said link means whereby rotation of said rotatable means will cause said lever to move the link means in said direction of rotation and cause the said lenses connected with said link means to be simultaneously rotated, a recess in the unitary front for receiving the link and lever, and a cover plate connected over said recess and link and lever assembly.

5. In a face mask goggle having two eye cup portions, a rigid front having a pair of spaced apertured lens receiving portions, a lens in each of the apertured lens receiving portions, means for holding said lenses against rotation, a second lens rotatably mounted in the lens receiving portions rearwardly of the first lens, spacer means between the front and rear lenses, link means pivotally connecting each of the back lenses, a rotatable knob located in the rigid front intermediate the back lenses, and a lever arm having one end thereof fixedly connected to the rotatable knob with the other end thereof pivotally connected to the link to cause rotation of the rear lenses in relation to the stationary front lenses, said link means and lever arm being positioned within a recess in the unitary front and an inner ring rearwardly of the rear lens secured to the rigid front, said inner ring bearing spring means for frictionally engaging the back lenses, and connection means for securing the inner rings with the eye cup portions of the face mask.

6. In a face mask goggle, a relatively rigid lens supporting structure with spaced apertured lens receiving portions, a pair of lenses in each of said apertured lens receiving portions, a pair of ring-like members, means for securing said ring-like members to said relatively rigid lens supporting structure with said ring-like members each having a portion overlying the respective lenses in the apertured lens receiving portions and functioning to retain said lenses in said lens receiving portions, one of the lenses in each of said lens receiving portions being held stationary and a link and lever arrangement connected with the other of said lenses for connection with a rotatable knob, said rotatable knob being located on the lens supporting structure and the link and lever arrangement being located in a recess within the said lens supporting structure, said lenses so connected being operable thereby for rotating simultaneously relative to the other of said lenses and connection means for securing the lens supporting structure to a face engaging portion.

7. In a goggle, a relatively rigid lens supporting structure with spaced apertured lens receiving portions, a pair of lenses in each of said apertured lens receiving portions, lens retaining means having a portion overlying the respective lenses in the apertured lens receiving portions and secured to the rigid lens supporting structure for retaining said lenses in said lens receiving portion, one of the lenses in each of said lens receiving portions being held stationary and the other being rotatable, said relatively rigid lens supporting structure having a recessed area with a continuous front wall portion intermediate the lenses with the means for retaining the lenses in the apertured lens receiving portions having a portion overlying the side of said recessed area opposed to the continuous wall, a link member in said recessed area and interconnected with the rotatable lenses, a rotatable knob-like member pivotally connected to the lens supporting structure with the pivot portion thereof communicating with the recessed area and means rigidly connected with said pivot portion and having a portion interconnected with the link member intermediate the ends thereof and lying within the recessed area for imparting simultaneous rotative movement to said rotatable lenses through the rotation of said rotatable knob-like member.

DANIEL P. BERNHEIM.
EDWARD M. SPLAINE.

REFERENCES CITED

The following references are of record in the file of this patent:

UNITED STATES PATENTS

| Number | Name | Date |
| --- | --- | --- |
| 2,248,864 | Greiner | July 8, 1941 |
| 1,865,691 | Hill | July 5, 1932 |
| 2,050,890 | Lynn | Aug. 11, 1936 |
| 2,130,127 | Fischer | Sept. 13, 1938 |
| 2,175,104 | Bouchard | Oct. 3, 1939 |
| 2,158,693 | Dym | May 16, 1939 |
| 2,251,330 | Fairbank | Aug. 5, 1941 |
| 2,075,094 | Chubb | Mar. 30, 1937 |
| 1,562,350 | Luckey | Nov. 17, 1925 |
| 1,963,437 | Gray | June 19, 1934 |
| 1,193,340 | Bader | Aug. 1, 1916 |
| 1,670,638 | Shindel | May 22, 1928 |